United States Patent Office 3,772,218
Patented Nov. 13, 1973

3,772,218
FLEXIBLE, OPEN-CELL, NON-DISCOLORING
POLYURETHANE FOAM
Roland J. Lamplugh, Chester, and Frederick W. Meisel, Jr., Media, Pa., assignors to Scott Paper Company, Delaware County, Pa.
No Drawing. Filed Oct. 12, 1971, Ser. No. 188,615
Int. Cl. C08g 22/44
U.S. Cl. 260—2.5 BB     15 Claims

ABSTRACT OF THE DISCLOSURE

Flexible, open-cell, polyurethane foams are prepared by reacting an aliphatic, or an aliphatic-like, organic polyisocyanate, such as dimethyl benzene $\omega,\omega'$-diisocyanate (xylylene diisocyanate) with an active-hydrogen-containing polyol in the presence of a mixed catalyst system comprising an alkanolamine, a stannous salt of a carboxylic acid, and a stannic salt of a carboxylic acid. Discoloration of the resulting foams can be prevented by including in the reaction mixture a mixed stabilizer system comprising a primary antioxidant, such as a high molecular weight hindered polyphenol, a second high antioxidant, such as a high molecular weight phosphite and an ultraviolet light absorbing compound.

BACKGROUND OF THE INVENTION

Field of the invention

The present invention relates generally to a process for producing a flexible, open-cell, stable, polyurethane foam from a reaction mixture containing an aliphatic; or an aliphatic-like organic polyisocyanate; to a method of stabilizing said foam to prevent discoloration thereof; and to the improved foams produced. More particularly, the invention relates to the use of a mixed catalyst system for the reaction of an aliphatic, or aliphatic-like, polyisocyanate with an active-hydrogen-containing polyol. The catalyst system comprises an alkanolamine, a stannous salt of a carboxylic acid and a stannic salt of a carboxylic acid. The resulting foams are stabilized to prevent discoloration thereof by the addition to the reaction mixture of a stabilizer system comprising a primary antioxidant, a secondary antioxidant and an ultraviolet light-absorbing compound.

DESCRIPTION OF THE PRIOR ART

Foamed, polyurethane materials derived from the reaction product of an organic polyisocyanate and an active-hydrogen-containing compound, such as water, polyols, including polyethers, polyesters, polyoxy-carboxy alkylenes, and the like are well-known in the art. However, these polyurethanes foams have a tendency to discolor to an unsatisfactory yellow to brown color during aging, especially when exposed to light and/or heat. The discoloration is believed to be due, at least in part, to the catalysts and/or elevated temperature employed to accelerate the foam-forming reaction. Several methods have previously been suggested for overcoming the discoloration problem.

It is now well-known that polyurethane foams prepared from the reaction of an aromatic isocyanate are more susceptible to discoloration than those prepared from an aliphatic, or an aliphatic-like, isocyanate. As used herein, the term aliphatic isocyanate is meant to include both those isocyanates which are truly aliphatic or alicyclic as well as the aliphatic-like compounds—i.e., those which, although they contain an aromatic ring, react as an aliphatic compound, due primarily to the fact that the isocyanate group is not attached directly to the ring. However, it has previously been difficult to produce a stable foam using aliphatic diisocyanates especially in a one-shot process at room temperature.

In British Patent 1,124,459 issued to Takeda Chemical Industries Limited, there is disclosed a process for preparing polyurethane foam utilizing an aliphatic isocyanate, an octaalkylstannoxane catalyst and a monoamino-alcohol to prevent cracking.

In U.S. Patent 3,580,873 issued to Bianca it is stated that a non-yellowing polyurethane foam can be prepared by reacting an isocyanato-terminated prepolymer with monoethanolamine in the presence of a catalytic amount of a metal drier compound such as calcium, zinc or lead naphthenate or octoate.

As mentioned above, there is usually added to the foam-forming reaction mixture a catalyst for the reaction. The most commonly employed catalysts include tertiary amines and tin salts. In U.S. Pat. 3,392,128 issued to Hostettler et al. it is disclosed that organotin compounds such as dibutyltin dilaurate are useful catalysts in the preparation of polyurethane foams. Similarly, in U.S. Pat. 3,198,757 issued to Ricciardi et al. there is disclosed a mixed catalyst system having a gel catalyst of the general formula $Sn(OCOR)_2$ and a blowing catalyst of the general formula $R'_3SnX$ where R and R' are hydrocarbon radicals and X is the negative residual portion of an organic carboxylic acid, a mercaptan, an alcohol, a phenol or a halogen acid.

It has also been suggested in the prior art to include ultra-violet light absorbers and antioxidants in polyurethane foams in an attempt to overcome the discoloration problem. However, there has heretofore not been available a flexible, stable, polyurethane foam which did not discolor after aging.

SUMMARY OF THE INVENTION

In accordance with the present invention flexible, stable, polyurethane foams having a reduced tendency to discolor are prepared by reacting an aliphatic polyisocyanate with a polyol capable of reacting with the isocyanate in the presence of a foaming agent and a mixed catalyst system. The catalyst system comprises an alkanolamine, a stannous salt of a carboxylic acid and a stannic salt of a carboylic acid. A further improvement in light and/or heat stability of the resulting foam is achieved by including in the reaction mixture a mixed stabilizer system comprising a primary antioxidant, a secondary antioxidant and an ultraviolet light absorbing compound.

DESCRIPTION OF THE PREFERRED EMBODIMENTS

As mentioned above, in accordance with the present invention polyurethane foam is prepared from a composition comprising:

(a) an aliphatic polyisocyanate,
(b) a polyol,
(c) a foaming agent, and
(d) a mixed catalyst system comprising.
   (i) an alkanolamine,
   (ii) a stannous salt of a carboxylic acid, and
   (iii) a stannic salt of a carboxylic acid.

A further improvement in stability, when exposed to light and/or heat, is achieved when a mixed stabilizer system comprising:

a primary antioxidant,
a secondary antioxidant, and
an ultraviolet light absorbing compound,
is added to the above composition.

Each of the components used in preparing foams in accordance with the present invention are discussed in detail below.

Isocyanate

As pointed out above the isocyanates useful in the practice of this invention can be defined as aliphatic isocyanates. These include both aliphatic and alicyclic compounds as well as the aliphatic-like compounds—i.e., those which, although they contain an aromatic ring, react as an aliphatic compound, due primarily to the fact that the isocyanate group is not attached directly to the ring. Representative aliphatic isocyanates include dimethyl benzene ω,ω'-diisocyanate (xylylene diisocyanate); 4,4'-methylenebiscyclohexyl diisocyanate and mixtures of isomers thereof; hexamethylene diisocyanate; methylcyclohexylene diisocyanate; diethylbenzene diisocyanate; 3-isocyanatomethyl-3,5,5-trimethylcyclohexylisocyanate; 2,2,4-trimethylhexamethylene diisocyanate; 2,6-diisocyanato methyl caproate lysine diisocyanate, methyl ester; and the like.

Polyol

The polyols which may be utilized in carrying out the present invention are those which are conventionally employed in the preparation of polyurethane foams and include both polyesters and polyethers. Suitable polyethers include the polyalkylene oxide ethers, such as the reaction products of ethylene oxide, propylene oxide, butylene oxide, hexadecylene oxide, styrene oxide, picolene oxide or methyl glycide, with a compound containing two or more reactive hydrogens, such as resoncinol, glycerol, trimethylol propane, pentaerythritol, ethylene glycol, diethylene glycol, triethylene glycol, and the uike.

Particularly useful polyethers are the polypropylene oxide adducts, such as polypropylene oxide adducts of glycerol.

Suitable polyesters can be prepared, for example, by conventional methods of condensation polymerization from polyols and dicarboxylic acids. A polyester glycol may be prepared from a diol, such as diethylene glycol, and a dicarboxylic acid, such as adipic acid.

Foaming agent

The foaming agent, or blowing agent, utilized to produce the foam in the polyurethane-forming reaction is conventionally produced by the reaction between polyisocyanate and water, which generates carbon dioxide as the blowing agent. Other usable blowing agents may be fluorocarbons having low boiling points, which are added to the polyurethane-forming reactants and which are volatilized by the exotherm of the polyurethane-forming reaction. Suitable low boiling agents include, for example, trichlorofluoromethane and methylene chloride.

Mixed catalyst system

As pointed out above the mixed catalyst system employed in carrying out the present invention comprises an alkanolamine, a stannous salt of a carboxylic acid and a stannic salt of a carboxylic acid.

Any suitable alkanolamine may be used in the practice of this invention. Representative alkanolamines include, for example, monoethanolamine, diethanolamine, triethanolamine, and the like.

Any suitable stannous salt of a carboxylic acid may be used in practicing this invention. It is especially preferred, however, to employ the stannous salts of carboxylic acids having from one to about twenty carbon atoms. Representative stannous salts include stannous octoate, stannous acetate, stannous adipate, stannous benzoate, stannous naphthanate, stannous butyrate, stannous caprate, stannous caproate, stannous cinnamate, stannous citraconate, stannous formate, stannous hexoate, stannous fumarate, stannous glutarate, stannous lactate, stannous laurate, stannous maleate, stannous malate, stannous malonate, stannous oleate, stannous oxalate, stannous palmitate, stannous phthalate, stannous propionate, stannous stearate, stannous suberate, stannous succinate, stannous tartrate, stannous toluylate and the like.

An suitable stannic salt of a carboxylic acid may be used in carrying out the present invention. As with the stannous salts, it is especially preferred to employ the stannic salts of carboxylic acids having from one to about twenty carbon atoms. Representative stannic salts include dibutyltin bis-stearylmaleate, dibutyltin dilaurate, dibutyl tin bis-cyclohexylmaleate and the like.

It should be understood that in the mixed catalyst system of this invention the amount of each individual component can be varied depending upon the composition of the remainder of the reaction mixture. It is preferred to employ at least 0.5 weight percent, based on the weight of polyol in the reaction mixture, of each component and a total of at least 1.5 weight percent, also based on the weight of polyol in the reaction mixture, of the mixed catalyst system. The especially preferred amounts of each of these components is from about 0.5 to about 2.0 weight percent, based on the weight of the polyol in the reaction mixture, of each individual component.

Mixed stabilizer system

As pointed out above, it is preferred to include a mixed stabilizer system in the foam-forming compositions. Such a system comprises a primary antioxidant, a secondary antioxidant and an ultraviolet light absorbing compound.

Suitable conventional antioxidants are disclosed in the comprehensive review article by Amberlang et al. in "Rubber Chemistry and Technology," vol. 36, pp. 1497 and following, (1963), particularly in Table I. (pp. 1507–9), Table III (p. 1513), Table IV (pp. 1514–6), Table V (p. 1519), and Table VII (pp. 1536–8), and the references cited therein. Antioxidants suitable for use in the invention are also disclosed in U.S. Pat. No. 2,985,617, Salyer et al., May 23, 1961, particularly column 15, line 56 to column 16, line 44. Particularly suitable antioxidants include 2,2'-methylenebis(4-methyl-6-nonylphenol), 2,2'-methylenebis(4 - methyl-6-t-butylphenol) (Plastanox 2246), 2,6-di(t-butyl)-4-methyl phenol, and similar substituted phenols; substituted hydroquinones, including the 2,5-dialkyl hydroquinones, such as those obtained by reacting alpha-olefins with hydroquinone, e.g., 2,5-di-($C_{14}/C_{16}$ alkyl) hydroquinone, as disclosed in U.S. Pat. No. 3,428,821 as well as 2,5-di(t-butyl) hydroquinone; bisphenols, such as polybutylated bisphenol A; bisphenol sulfides such as bis(3-methyl-4-hydroxybenzyl) sulfide, 2,2'-thiobis(6-t-octyl-4-methylphenyl); hydrazides such as adipic hydrazides, bis(hydroxy-alkyl-benzylthio) compounds of the type disclosed in U.S. Pat. No. 3,331,792, O'Shea, July 18, 1967, such as bis(2-hydroxy-3-nonyl-5-methylbenzylthio) diethyl ether; phosphites such as diphenyl phosphite, tris(nonylphenyl) phosphite; salicylates such as phenyl salicylates; metal dialkyl dithiocarbamates such as zinc dibutyl dithiocarbamate, etc. In some cases a particular chemical may serve at least in part to perform both an antioxidant function and an ultraviolet absorbing function. Further information on antioxidants suitable for use in the present invention is found in "Modern Plastics Encyclopedia," (1968, pp. 418, 419 and 521, and the chart on pp. 503–5.

As discussed above, in carrying out this invention, a primary antioxidant is used in combination with a secondary antioxidant. Representative primary antioxidants are "Irganox 1010," a high molecular weight hindered polyphenol vended by Geigy; "Plastinox 2246," believed to be 2,2' - methylene-bis(4-methyl-6-tert-butylphenol) vended by American Cyanamid Co.; "Antioxidant No. 22," believed to be N,N'-di-sec-butyl-para-phenylenediamine vended by E. I. du Pont; "Ionox 330," believed to be 1,3,5 - trimethyl-2,4,6-tris(3,5-di-tert-butyl-4-hydroxy benzyl) benzene vended by Shell Oil Company. It has been found that the most preferred class of primary antioxidants are the high molecular weight hindered polyphenols.

Representative secondary antioxidants are "Uvi-Nox 3100," a tri(mixed mono and dinonyl phenyl) phosphite vended by GAF; "Wytox 345 and 348," polymeric phosphites vended by National Polychemicals, Inc.; "Plastanox LTDP," believed to be dilaurylthiodipropionate vended by American Cyanamid Company. The high molecular weight phosphites are especially preferred as secondary antioxidants.

Suitable conventional ultraviolet light absorbing compounds, also called ultraviolet absorbers, are defined and described in "Modern Plastics Encyclopedia," 1968, pp. 406–409, and are listed in variety in the chart on pp. 508, 509, the disclosures of which are incorporated herein by reference. Important classes of useful ultraviolet screening agents include the hydroxyphenyl benzotriazoles, such as 2-(2'-hydroxyphenyl)benzotriazoles, the 2-hydroxybenzophenones, the substituted acrylonitriles, the salicyclic acid derivatives and the 2-hydroxyphenyltriazines. Examples are 2-(2'-hydroxyphenyl)benzotriazole, 2 - hydroxybenzophenone, ethyl-2-cyano-3-phenyl cinnamate (substituted acrylonitrile), phenyl salicylate, and 1,3,5-tris(2'-hydroxyphenyl)triazine. Further examples are t-butyl phenyl salicylate, 2,4-dihydroxy benzophenone (Uvinul 400), 2,4-dibenzoyl resorcinol, 2-hydroxy-4-methoxy benzophenone (Uvinol-M40) alkylated 2-hydroxyphenyl benzotriazole, 2-hydroxy - 4 - octyloxy benzophenone (Cyasorb UV531) and 1-cyano-2,2-diphenyl acrylonitrile. Other examples are 2-(2'-hydroxy-3',5' - di-t-butylphenyl)-7-chlorobenzotriazole (Tinuvin 327), 2,4'-dihydroxy-4-methoxy benzophenone (Uvinul D24), 2,2' - dihydroxy - 4,4' - dimethoxy benzophenone (Uvinul D49), 2,2',4,4'-tetrahydroxy benzophenone (Uvinul D50), 2,2'-dihydroxy-4-methoxy benzophenone (Cyasorb UV24) and 2(2'-hydroxy-5'-methylphenyl) benzotriazole (Tinuvin P), p-amino-zobenzene, hydroquinone, etc. The substituted benzotriazoles are especially preferred.

It should be understood that in the mixed stabilizer system of this invention the amount of each individual component can be varied depending upon the composition of the remainder of the reaction mixture. It is preferred to employ at least about 1.0 weight percent, based on the weight of polyol in the reaction mixture, of the ultraviolet light absorbing compound and about 2.0 weight percent, also based on the weight of polyol in the reaction mixture, of the combined primary and secondary antioxidants. The ratio of primary antioxidant to secondary antioxidant is preferably from about 2:1 to about 5:1 with a ratio of about 2.5:1 being especially preferred.

When the mixed stabilizer system described above is incorporated into the polyurethane foam-forming reaction mixture of this invention it is preferred, to achieve a stable foam, to include a surfactant such as those which are normally employed in rigid polyether-based foam systems. These surfactants are well known in the art and include, for example, DC–193, a silicone glycol copolymer, available from Dow Corning Corporation, Midland, Mich. By comparison, it has been found that foams containing surfactants which are normally utilized in systems employing polyester polyols and aromatic isocyanates often undergo a boiling collapse. These surfactants include L–532, a polyoxyalkylene-siloxane copolymer available from Union Carbide Corporation, New York, New York and EL719 a polyoxyethylated vegetable oil available from General Aniline and Film Corporation, New York, N.Y.

In carrying out the present invention, the one-shot technique for producing foam is usually employed at room temperature. In the one-shot method all of the ingredients, that is, the polyol, the aliphatic polyisocyanate, the foaming agent, the mixed catalyst system, the surfactant and the mixed stabilizer system are simultaneously mixed with each other by any suitable means and then poured into a mold where the foaming reaction takes place. Any suitable mixing-type apparatus may be used. The mixing device may have any number of conduits leading thereto for introducing the different ingredients. For example, there may be one conduit for each ingredient or there may be a number less than the number of different ingredients. If the number of conduits is less than the total number of ingredients utilized, of course, it will be necessary to combine several of the ingredients prior to introducing them into the mixer. The ingredients may be combined in any suitable manner, the only requirement being that premature reaction should not occur prior to introducing into the mixer. Thus, the isocyanate and the water, if water is utilized as the foaming agent, would not be combined into a solution and introduced into the mixer for the reason that the isocyanate and the water would prematurely react to form urea groups. Also, the isocyanate and the polyol would not generally be combined prior to introduction into the mixer for the reason that some reaction might occur. However, in certain circumstances, it would be possible for these ingredients to be admixed prior to introduction into the mixer. It is generally undesirable to premix the stannous salt with a silicone surfactant for the reason that the stannous compounds also cause the further polymerization of the silicone compounds. However, if the material is to be used within short periods after the mixture is first accomplished, no detrimental effects will result by admixing the stannous compound with the silicone compound.

In the preparation of cellular polyurethane plastics by the one-shot method, the aliphatic polyisocyanate is utilized preferably in an amount which is the stoichiometric equivalent of the active hydrogen-containing groups of the other reactants. In some instances, the percentage of —NCO groups present may be slightly less or greater than that required to react with all of the hydroxyl groups. The preferred quantity of —NCO groups is preferably from about 0.9 to about 1.2 for each hydrogen atom supplied by the polyester or polyether and water.

If water is utilized as the foaming agent, only a small amount of water is required to cause the foaming of the mixture after it is introduced into a suitable mold. An amount of from about 0.5 to about 5.0 parts based on the weight of the polyhydroxyl resin may be used, depending upon the density of the resulting foam desired. If an organosilicone is utilized to stabilize foaming, it may be used in an amount from about 0.1 to about 5 parts by weight. It has been found, however, that for best results from about 0.5 to about 1.5 parts based on the weight of the polyhydroxyl resin be used.

In addition to the above-mentioned components the reaction mixture may also include other suitable additives, such as flame retardants, cross-linking agents, plasticizers and coloring agents.

The catalyst system of this invention is especially significant since one would expect the one-shot process for producing foam to be less efficient in the reaction of the hydroxyl groups of the polyol than the prepolymer process; and, since the reaction of the aliphatic isocyanates used in this invention is known to be extremely sluggish. It was quite unexpected that a one-shot process would produce foam having satisfactory cell size and uniform cell distribution. An additional advantage associated with the stable, flexible foamed polymer structures of this invention is that aliphatic isocyanate-based compositions are essentially colorless, and do not aggravate the problem of discoloration of the reaction product.

Foams produced in accordance with the present invention are especially useful in light colored products which will be exposed to view. These products do not discolor even after long periods of direct exposure to light and for heat. Representative products include, for example, exposed protective cushioning and the like.

In order to describe the present invention so that it may be more clearly understood, the following examples are set forth. These examples are set forth primarily for the purpose of illustration, and any specific enumeration of detail contained therein should not be interpreted as a limitation on the concept of this invention. All components in the foam-forming compositions are given in parts by weight. The following trademarks and symbols are used in the examples:

Fomrez 50 is a glycol adipate-type polyester polyol available from Witco Chemical Company, New York, N.Y.

L-532 is a polyoxyalkylene siloxane copolymer available from Union Carbide Corporation, New York, N.Y.

DC-193 is a silicon glycol copolymer available from Dow Corning Corporation, Midland, Mich.

T-26 is primarily dibutyltin bis-stearylmaleate available from M&T Chemicals, Inc., Rahway, N.J.

XDI is xylylene diisocyanate.

"Irganox 858," "Irganox 1010" and "Irganox 1076" are hindered phenols available from Geigy Industrial Chemicals, N.Y.

Plastanox 2246 is 2,2'-methylenebis(4-methyl-6-t-butylphenol).

Antioxidant No. 22 is believed to be N,N'-di-sec-butyl-para-phenylenediamine and is available from E. I. du Pont de Nemours & Company, Wilmington, Del.

Topanol CA is 1,1,3-tris(2-methyl-4-hydroxy-5-t-butylphenyl) butane available from Imperial Chemical Industries, Ltd.

Ionox 330 is believed to be 1,3,5-trimethyl-2,4,6-tris-(3,5 - di - tert - butyl - 4 - hydroxy benzyl) benzene and is vended by Shell Oil Company.

Plastanox LTDP is believed to be dilaurylthiodipropionate and is vended by American Cyanamid Company.

Wytox 345 and Wytox 348 are polymeric phosphites available from National Polychemicals, Inc., Wilmington, Mass.

Uvi-Nox 3100 is a tri(mixed mono and di nonyl phenyl) phosphite available from General Aniline and Film Corporation, New York, N.Y.

Tinuvin 328 and Tinuvin P are substituted benzotriazoles available from Geigy Industrial Chemical, Ardsley, N.Y.

Naftone 317 is an ester of a crotonic acid derivative and is available from Naftone, Inc., New York, N.Y.

Uvinul N-539 is 2 - ethylhexyl - 2-cyano-3,3-diphenyl acrylate available from General Aniline and Film Corporation, New York, N.Y.

Cyasorb UV 531 is 2-hydroxy-4-octyloxy benzophenone vended by American cyanamid Company.

Cyasorb UV 1988 is p-methoxy benzylidene-malonic acid, dimethyl ester vended by American Cyanamid Company.

W&M 180 is a glycol adipate type polyester polyol from Wilson Martin Chemical Company, Philadelphia, Pa.

"Hylene TM" is an 80:20 mixture of the 2,4- and 2,6-isomers of toluene diisocyanate available from E. I. du Pont de Nemours & Company, Wilmington, Del.

"EL-719" is a polyoxyethylated vegetable oil vended by General Aniline & Film Corporation, New York, N.Y.

The term "index," as used herein, and as commonly used in the polyurethane art, is the ratio of the actual amount of polyisocyanate in the reaction mixture to the theoretical amount of polyisocyanate needed for reaction with all active hydrogen compounds present in the reaction mixture, multiplied by 100.

EXAMPLE I

Foams were prepared from the foam formulations shown in Table I. All of these formulations containing

TABLE I

|  | A | B | C | D | E | F | G | H |
|---|---|---|---|---|---|---|---|---|
| Fomrez 50 | 100 | 100 | 100 | 100 | 100 | 100 | 100 | 100 |
| L-532 | 1.0 | 1.0 | 1.0 | 1.0 | 1.0 | 1.0 | 1.0 | 1.0 |
| Alkanolamine | ¹1.0 | | | ¹3.0 | | | ¹3.0 | ¹1.0 |
| Stannous salt | | ⁴1.0 | | | ⁴3.0 | | ⁴1.0 | |
| Stannic salt | | | ⁷1.0 | | | ⁷3.0 | | ⁷1.0 |
| H₂O | 3.0 | 3.0 | 3.0 | 3.0 | 3.0 | 3.0 | 3.0 | 3.0 |
| Xylylene diisocyanate | 43.0 | 43.0 | 43.0 | 43.0 | 43.0 | 43.0 | 43.0 | 43.0 |
| Index | 105 | 105 | 105 | 105 | 105 | 105 | 105 | 105 |
| Reactivity cream time | 1:00 | 0:45 | 0:45 | 0:35 | 0:30 | 0:50 | 0:50 | 0:40 |
| Rise time | | 5:30 | 1:15 | | 1:35 | 2:42 | 8:00 | 2:00 |

|  | I | J | K | L | M | N | O | P | Q |
|---|---|---|---|---|---|---|---|---|---|
| Fomrez 50 | 100 | 100 | 100 | 100 | 100 | 100 | 100 | 100 | 100 |
| DC-193 | | | | | | | | | 2.0 |
| L532 | 1.0 | 1.0 | 1.0 | 1.0 | 1.0 | 1.0 | 1.0 | 1.0 | |
| Alkanolamine | | ¹1.0 | ²1.0 | ³1.0 | ¹1.0 | ¹1.0 | ¹1.0 | ¹1.0 | ¹1.0 |
| Stannous salt | ⁴1.0 | ⁴1.0 | ⁴1.0 | ⁴1.0 | ⁵1.0 | ⁶1.0 | ⁴1.0 | ⁴1.0 | ⁴1.0 |
| Stannic salt | ⁷1.0 | ⁷1.0 | ⁷1.0 | ⁷1.0 | ⁷1.0 | ⁷1.0 | ⁸1.0 | ⁹1.0 | ⁷1.0 |
| H₂O | 3.0 | 3.0 | 3.0 | 3.0 | 3.0 | 3.0 | 3.0 | 3.0 | 3.0 |
| Isocyanate | ¹⁰43.0 | ¹⁰43.0 | ¹⁰43.0 | ¹⁰43.0 | ¹⁰43.0 | ¹⁰43.0 | ¹⁰43.0 | ¹⁰43.0 | ¹¹61.3 |
| Index | 105 | 105 | 105 | 105 | 105 | 105 | 105 | 105 | 105 |
| Reactivity cream time | 0:45 | 0:22 | 0:37 | 0:35 | 0:55 | 0:33 | 0:38 | 0:35 | 0:11 |
| Rise time | 2:22 | 2:15 | 2:27 | 2:07 | 3:05 | 4:20 | 2:30 | 2:10 | 1:25 |

¹ Monoethanolamine.
² Diethanolamine.
³ Triethanolamine.
⁴ Stannous octoate.
⁵ Stannous oleate.
⁶ Stannous oxalate.
⁷ Dibutyltin bis-stearylmaleate.
⁸ Dibutyltin dilaurate.
⁹ Dibutyltin bis-cyclohexylmaleate.
¹⁰ Xylylene diisocyanate.
¹¹ 4,4'-methylene bis (cyclohexyl isocyanate).

RESULTS:
Since there was essentially no foaming of Formulation A, it did not rise.
Formulation B produced a foam, but it was weak and so unstable that it collapsed.
Formulation C boiled resulting in coarse, irregular cells and a large split and produced a foam with a very low rise.
Formulation D boiled and there was essentially no foaming.
Formulation E produced a foam with a low rise having an extremely irregular structure with numerous splits and cavities.
The foam produced by Formulation F boiled at the top of the rise and collapsed.
Since there was essentially no foaming of Formulation G, it did not rise.
Formulation H produced a stable, irregular, coarse, open-cell foam with a density equal to 1.87 lbs. per cu. ft.
The foam produced by Formulation I had numerous splits and cavities.
Formulation J produced a stable, slightly irregular, fine, open-cell foam with a density of 1.96 lbs. per cu. ft.
Formulation K produced a stable, slightly irregular, fine, open-cell foam with a density equal to 1.92 lbs. per cu. ft.
Formulation L produced a stable, slightly irregular, fine open-cell foam having a density equal to 2.56 lbs. per cu. ft.
Formulation M produced a stable, slightly irregular, fine, open-cell foam having a density equal to 1.99 lbs. per cu. ft.
Formulation N produced a stable, irregular, medium, open-cell foam having a density equal to 2.28 lbs. per cu. ft.
Formulation O produced a stable, irregular, coarse, open-cell foam having a density equal to 2.40 lbs. per cu. ft.
Formulation P produced a stable, slightly irregular, fine, open-cell foam having a density equal to 2.24 lbs. per cu. ft.
Formulation Q produced a stable, slightly irregular, medium, open-cell foam having a density equal to 3.25 lbs. per cu. ft.

xylylene diisocyanate were prepared in a one-shot process carried out at room temperature.

The results demonstrate that the mixed catalyst system of this invention is effective in catalyzing the reaction between the —NCO groups of an aliphatic polyisocyanate and the active hydrogens of the polyol, and that such catalysts are useful in producing stable aliphatic polyisocyanate-based foamed materials.

EXAMPLE II

Foams were prepared from the foam formulations shown in Table II in a one-shot process carried out at room temperature. The foam formulations contained both the mixed catalyst system and the mixed stabilizer system of this invention. The results also given in Table II point out the improved stability of foams containing the mixed stabilizer system of the present invention.

Heat stability was tested by placing the foams in an oven set at 140° C. for 22 hours.

Light stability was tested by placing the foams in an Atlas Weatherometer where it was exposed to radiation from an enclosed violet carbon arc lamp source at a temperature of 145° F. for 40 hours.

EXAMPLE III

Three foam samples were prepared from the formulations shown in Table III.

TABLE III

|  | A | B | C |
|---|---|---|---|
| Fomrez 50 | 100 | 100 | 100 |
| L532 | 1.0 | 1.0 |  |
| N-ethylmorpholine | 2.5 |  |  |
| Water | 3.0 | 3.0 | 3.0 |
| Hylene TM | 40.7 |  |  |
| Index | 105 | 105 | 105 |
| Stannous octoate |  | 1.0 | 1.0 |
| T26 |  | 1.0 | 1.0 |
| Monoethanolamine |  | 1.0 | 1.0 |
| Xylylene diisocyanate |  | 43.0 | 43.0 |
| DC193 |  |  | 1.0 |
| UVI-NOX 3100 |  |  | 1.0 |
| Irganox 1010 |  |  | 2.5 |
| Tinuvin 328 |  |  | 3.0 |

Foam A was a conventional aromatic isocyanate based polyurethane foam. Foam B was an aliphatic isocyanate based polyurethane foam prepared utilizing the mixed catalyst system of this invention. Foam C was an aliphatic isocyanate-based polyurethane foam prepared utilizing the

TABLE II

|  | A | B | C | D | E | F | G | H |
|---|---|---|---|---|---|---|---|---|
| Fomrez 50 | 100 | 100 | 100 | 100 | 100 | 100 | 100 | 100 |
| Surfactant | 1.0¹ | 1.0¹ | 1.0¹ | 1.0¹ | 1.0¹ | 1.0¹ | 1.0¹ | 1.0¹ |
| Stannous Octoate | 1.0 | 1.0 | 1.0 | 1.0 | 1.0 | 1.0 | 1.0 | 1.0 |
| T-26 stannic | 1.0 | 1.0 | 1.0 | 1.0 | 1.0 | 1.0 | 1.0 | 1.0 |
| Monoethanolamine | 1.0 | 1.0 | 1.0 | 1.0 | 1.0 | 1.0 | 1.0 | 1.0 |
| Antioxidant (primary) | 2.5¹ | 2.5² | 2.5³ | 2.5⁴ | 2.5⁵ | 2.5⁵ | 2.5⁶ | 2.5⁷ |
| Antioxidant (secondary) | 1.0¹ | 1.0¹ | 1.0¹ | 1.0¹ | 1.0¹ | 1.0¹ | 1.0¹ | 1.0¹ |
| UV absorber | 3.0¹ | 3.0¹ | 3.0¹ | 3.0¹ | 3.0¹ | 3.0¹ | 3.0¹ | 3.0¹ |
| H₂O | 3.0 | 3.0 | 3.0 | 3.0 | 3.0 | 3.0 | 3.0 | 3.0 |
| Xylylene diisocyanate | 43.0 | 43.0 | 43.0 | 43.0 | 43.0 | 43.0 | 43.0 | 43.0 |
| Index | 105 | 105 | 105 | 105 | 105 | 105 | 105 | 105 |
| Oven aging (22 hrs. at 140° C.): |  |  |  |  |  |  |  |  |
| Color change | Dark brown | Light yellow | None | None | Slight discoloration | Slight discoloration | Slight discoloration | Slight discoloration |
| Tensile (p.s.i.) | 8.8 | 12.9 | 12.1 | 11.4 | 12.7 | 12.2 | 11.0 | 14.1 |
| Initial tensile (p.s.i.) | 14.3 | 15.3 | 14.6 | 13.0 | 14.2 | 14.3 | 14.4 | 18.1 |
| Weather-Ometer (40 hr. exposure): |  |  |  |  |  |  |  |  |
| Color retention | Poor | Good | Excellent | Fair | Good | Fair | Excellent | Not evaluated |
| Surface tack | Melted at 20 hrs. | Negligible | None | Tacky | Negligible | Negligible | Negligible | Not evaluated |

|  | I | J | K | L | M | N | O | P |
|---|---|---|---|---|---|---|---|---|
| Fomrez 50 | 100 | 100 | 100 | 100 | 100 | 100 | 100 | 100 |
| Surfactant | 1.0¹ | 1.0¹ | 1.0¹ | 1.0¹ | 1.0² | 1.0² | 1.0² | 1.0². |
| Stannous octoate | 1.0 | 1.0 | 1.0 | 1.0 | 1.0 | 1.0 | 1.0 | 1.0 |
| T-26 | 1.0 | 1.0 | 1.0 | 1.0 | 1.0 | 1.0 | 1.0 | 1.0 |
| Monoethanolamine | 1.0 | 1.0 | 1.0 | 1.0 | 1.0 | 1.0 | 1.0 | 1.0 |
| Antioxidant (primary) | 2.5² | 2.5² | 2.5² | 2.5² | 2.5² | 2.5² | 2.5² | 2.5² |
| Antioxidant (secondary) | 1.0² | 1.0³ | 1.0⁴ | 1.0¹ | 1.0¹ | 1.0¹ | 1.0¹ | 1.0¹. |
| UV absorber | 3.0¹ | 3.0¹ | 3.0¹ | 3.0² | 3.0³ | 3.0⁴ | 3.0⁵ | 3.0⁶ |
| H₂O | 3.0 | 3.0 | 3.0 | 3.0 | 3.0 | 3.0 | 3.0 | 3.0 |
| Xylylene diisocyanate | 43.0 | 43.0 | 43.0 | 43.0 | 43.0 | 43.0 | 43.0 | 43.0 |
| Index | 105 | 105 | 105 | 105 | 105 | 105 | 105 | 105 |
| Oven aging (22 hrs. at 140° C.): |  |  |  |  |  |  |  |  |
| Color change | None | None | None | None | Light yellow | None | Very light yellow | Slight discoloration |
| Tensile (p.s.i.) | 12.1 | 8.5 | 14.0 | 10.8 | 15.1 | 16.8 | 13.9 | 13.4 |
| Initial tensile (p.s.i.) | 14.6 | 8.1 | 14.4 | 14.9 | 15.8 | 16.4 | 12.2 | 14.3 |
| Weather-Ometer (40 hr. exposure): |  |  |  |  |  |  |  |  |
| Color retention | Excellent | Excellent | Excellent | Good | Good | Good (After 20 hrs.) | Fair | Fair (After 20 hrs.) |
| Surface tack | None | None | None | Slightly tacky | Partial melting | Tacky | Partial melting | Negligible. |

TABLE II key:
 I. Surfactants:
  ¹ DC-193.
  ² L-532.
 II. Antioxidants (Primary):
  ¹ Irganox 858.
  ² Irganox 1010.
  ³ Irganox 1076.
  ⁴ Plastanox 2246.
  ⁵ Antioxidant No. 22.
  ⁶ Topanol CA.
  ⁷ Ionox 330.
 III. Antioxidants (Secondary):
  ¹ Plastanox LTDP.
  ² Wytox 345.
  ³ Wytox 348.
  ⁴ Uvi-Nox 3100.
 IV. UV Absorbers:
  ¹ Tinuvin 328.
  ² Tinuvin P.
  ³ Naftone 317.
  ⁴ Uvinul N-539.
  ⁵ Cyasorb UV 531.
  ⁶ Cyasorb UV 1988.

mixed catalyst system and the mixed stabilizer system of the present invention.

The resulting foams were subjected to outdoor exposure tests, the results of which are given in Table IV. In the outdoor exposure tests, which were conducted in Florida, the test samples were mounted under glass using a 45° south stationary mount. The test specimens were exposed to from 0 to 30,000 Langleys. Langleys are the gram calories of energy per square centimeter of exposed foam surface.

TABLE IV

| Exposure (Langleys) | A | B | C |
|---|---|---|---|
| 5,000 | Discoloration | Severe degradation, yellowing and melting.[1] | No observable change. |
| 10,000 | Increasing degree of discoloration. | | Do. |
| 15,000 | do | | Slight yellowing, slightly tacky surface. |
| 20,000 | do | | Increased yellowing, tacky surface. |
| 25,000 | do | | Do. |
| 30,000 | do | | No additional change with increased exposure. |

[1] Testing of (B) discontinued after 5,000 Langleys.

EXAMPLE IV

Foams were prepared from the formulations shown in Table V by a one-shot process at room temperature on a conventional foam machine. The stabilizers used in the foamable formulations were solids, i.e., a standard primary antioxidant, Irganox 1010, and a UV absorber, Tinuvin 328, both of which were described hereinabove. The solid stabilizers were predissolved in the XDI and solubilized therein with perchloroethylene. The use of perchloroethylene prevents precipitation of the stabilizer system for a period of about one week at room temperature (about 72° F.). Without the use of perchloroethylene as a solubilizing agent for the solid stabilizers, the stabilizer would crystallize from solution within 24 hours, thus blocking the isocyanate pumping system, e.g., pump, filter, lines and nozzles. It can be seen from the data shown in Table IV that the mechanically produced foams utilizing the mixed catalyst system and the mixed stabilizer system of this invention are characterized by improved physical properties as well as improved heat and light stability.

What is claimed is:

1. In a method for preparing urethane foams wherein an aliphatic polyisocyanate is reacted with a polyol in the presence of a foaming agent, the improvement which comprises including in the reaction mixture a mixed catalyst system comprising an alkanolamine selected from the group consisting of monoethanolamine, diethanolamine and triethanolamine, a stannous salt of a carboxylic acid and a stannic salt of a carboxylic acid and a mixed stabilizer system comprising a primary antioxidant, a secondary antioxidant and an ultraviolet light absorbing compound.

2. A composition, useful in forming a polyurethane foam when incorporated with an aliphatic polyisocyanate and a foaming agent, comprising a polyol, a mixed catalyst system comprising an alkanolamine selected from the group consisting of monoethanolamine, diethanolamine and triethanolamine, a stannous salt of a carboxylic acid, and a stannic salt of a carboxylic acid and a mixed stabilizer system comprising a primary antioxidant, a secondary antioxidant and an ultraviolet light absorbing compound.

3. A composition, as claimed in claim 2, wherein the mixed catalyst system is present in an amount equal to at least 1.5 weight percent, based on the weight of polyol in said composition.

4. A composition, as claimed in claim 2, in which the stannous salt of a carboxylic acid is stannous octoate.

5. A composition, as claimed in claim 2, in whch the stannous salt of a carboxylic acid is stannous oleate.

6. A composition, as claimed in claim 2, in which the stannous salt of a carboxylic acid is stannous oxalate.

7. A composition, as claimed in claim 2, in which the stannic salt of a carboxylic acid is dibutyltin bis-stearylmaleate.

8. A composition, as claimed in claim 2, in which the stannic salt of a carboxylic acid is dibutyltin dilaurate.

9. A composition, as claimed in claim 2, in which the stannic salt of a carboxylic acid is dibutyltin bis-cyclohexylmaleate.

10. A composition, as claimed in claim 2, in which the aliphatic polyisocyanate is xylylene diisocyanate.

11. A composition, as claimed in claim 2, wherein the ultraviolet light absorbing compound in the mixed stabilizer system is present in an amount equal to 1.0 weight percent, based on the weight of polyol present in the reaction mixture.

12. A composition, as claimed in claim 2, wherein the

TABLE V

| | A | B | C | D | E | F |
|---|---|---|---|---|---|---|
| W&M 180 | 100 | 100 | 100 | 100 | 100 | 100 |
| DC-193 | 1.0 | 1.0 | 1.0 | 1.0 | 1.0 | 1.0 |
| Stannous octoate | 1.0 | .90 | 1.18 | .75 | .75 | 1.0 |
| T-26 | .50 | .75 | .88 | .50 | | |
| Monoethanolamine | .75 | .675 | .60 | .625 | .375 | .75 |
| UVI-NOX 3100 | 1.0 | 1.0 | 1.18 | .50 | .625 | 1.0 |
| Irganox 1010 | 2.5 | 2.5 | 2.5 | 2.0 | .375 | 2.5 |
| Tinuvin 328 | 3.0 | 3.0 | 3.0 | 2.4 | 2.0 | 3.0 |
| Perchloroethylene | 5.0 | 5.0 | 5.0 | 4.0 | 2.4 | 5.0 |
| H₂O | 2.5 | 2.25 | 2.0 | 2.25 | 4.0 | 5.0 |
| XDI | 37.4 | 37.4 | 37.4 | 34.6 | 2.25 | 2.5 |
| Index | 105 | 110 | 120 | 105 | 34.6 | 37.4 |
| Density (p.c.f.) | 2.14 | 2.76 | 2.73 | 2.44 | 105 | 105 |
| Tensile (p.s.i.) | 16.0 | 11.3 | 10.4 | 18.4 | 2.40 | ([1]) |
| Percent elongation | 304 | 202 | 157 | 360 | 16.3 | ([1]) |
| Tear (p.l.i.) | 2.9 | 1.8 | 1.5 | 3.0 | 326 | ([1]) |
| Percent comp. set | 43.2 | 40.2 | 5.5 | 44.1 | 3.0 | ([1]) |
| Percent comp. deflection: | | | | | 41.7 | ([1]) |
| 25% ins | .49 | .49 | .73 | .49 | .50 | |
| 25%, 1 min | .38 | .39 | .59 | .40 | .40 | ([1]) |
| 50% ins | .55 | .67 | .80 | .59 | .63 | ([1]) |
| 50%, 1 min | .45 | .52 | .66 | .48 | .50 | ([1]) |
| 65% ins | .78 | 1.09 | 1.21 | .88 | .99 | ([1]) |
| 65%, 1 min | .62 | .84 | .99 | .71 | .74 | ([1]) |
| Oven aging (22 hrs. at 140° C.): | | | | | | |
| Color change | None | Very slight discoloration. | Very slight discoloration. | None | None | ([1]) |
| Tensile (p.s.i.) | 16.6 | 12.5 | 9.1 | 17.6 | 14.8 | ([1]) |
| Fadeometer: | | | | | | |
| 10 hrs | No change | No change | No change | No change | No change | ([1]) |
| 20 hrs | Very slight discoloration. | Very slight discoloration. | Very slight discoloration. | Slight yellowing | Yellowing | ([1]) |
| 40 hrs | Yellowing; slightly tacky. | Slight yellowing; slightly tacky. | Yellowing; slightly tacky. | Slight yellowing; slightly tacky. | Yellowing; tacky. | ([1]) |

[1] Stable foam; slightly irregular; open-cells; large split; density equals 2.17 lbs. per cu. ft.

ratio of primary antioxidant to secondary antioxidant is from about 2 to 1 to about 5 to 1.

13. A composition, as claimed in claim 2, wherein the primary antioxidant is a hindered polyphenol.

14. A composition, as claimed in claim 2, wherein the secondary antioxidant is a high molecular weight phosphite.

15. A composition, as claimed in claim 2, in which the ultraviolet light absorbing compound is a substituted benzotriazole.

References Cited

UNITED STATES PATENTS

| | | | |
|---|---|---|---|
| 3,703,484 | 11/1972 | Keshi et al. | 260—2.5 AC |
| 2,985,617 | 5/1961 | Salyer et al. | 260—45.95 R |
| 3,520,835 | 7/1970 | Chandley et al. | 260—2.5 AC |
| 3,554,962 | 1/1971 | Fischer | 260—77.5 AT |

FOREIGN PATENTS

| | | | |
|---|---|---|---|
| 1,124,459 | 8/1968 | Great Britain | 260—2.5 AB |

M. J. WELSH, Primary Examiner

U.S. Cl. X.R.

260—2.5 AC; 252—182, 400, 404, 405

UNITED STATES PATENT OFFICE
CERTIFICATE OF CORRECTION

Patent No. 3,772,218        Dated  November 13, 1973

Inventor(s)  R. J. Lamplugh and F. W. Meisel

It is certified that error appears in the above-identified patent and that said Letters Patent are hereby corrected as shown below:

Column 1, line 22, cancel "high"
Column 1, line 22, "second" should be --secondary--
          line 52, "polyurethanes" should be --polyurethane--

Column 3, line 26, "uike" should be --like--
          line 71, "An" should be --Any--

Column 4, line 23, "Table I" should be --Table II--

Column 8, line 10, "cyanamid" should be --Cyanamid--

Table I, line 1, column A, "1 0" should be --100--
         line 3, column G, "$^1$3.0" should be --$^1$1.0--

Results, Formulation M, "1.99" should be --1.89--

Table II, Column P, line 8, "$3.0^5$" should be --$3.0^6$--

Table V, line 3, Column D, ".75" should be --1.0--

Signed and sealed this 23rd day of April 1974.

(SEAL)
Attest:

EDWARD M.FLETCHER,JR.          C. MARSHALL DANN
Attesting Officer              Commissioner of Patents